US009019252B2

(12) United States Patent
Ogita

(10) Patent No.: US 9,019,252 B2
(45) Date of Patent: Apr. 28, 2015

(54) DISPLAY DEVICE, DISPLAY METHOD, AND PROGRAM FOR SAVING POWER IN A STANDBY MODE

(75) Inventor: Takeshi Ogita, Tokyo (JP)

(73) Assignees: Sony Corporation, Tokyo (JP); Sony Mobile Communications AB, Lund (SE)

( * ) Notice: Subject to any disclaimer, the term of this patent is extended or adjusted under 35 U.S.C. 154(b) by 499 days.

(21) Appl. No.: 12/761,700

(22) Filed: Apr. 16, 2010

(65) Prior Publication Data

US 2010/0271356 A1 Oct. 28, 2010

(30) Foreign Application Priority Data

Apr. 24, 2009 (JP) ................................ P2009-106854

(51) Int. Cl.
*G06F 3/038* (2013.01)
*G09G 3/36* (2006.01)

(52) U.S. Cl.
CPC ........ *G09G 3/3611* (2013.01); *G09G 2300/023* (2013.01); *G09G 2300/0456* (2013.01); *G09G 2320/0247* (2013.01); *G09G 2330/021* (2013.01); *G09G 2340/0435* (2013.01); *G09G 2360/144* (2013.01)

(58) Field of Classification Search
CPC .................. G09G 2330/021; G09G 2330/027; G09G 3/3611
USPC ............................................. 345/87, 99, 207
See application file for complete search history.

(56) References Cited

U.S. PATENT DOCUMENTS

| | | | | |
|---|---|---|---|---|
| 6,307,533 | B1 * | 10/2001 | Nakamura et al. | 345/95 |
| 7,995,050 | B2 * | 8/2011 | Wong et al. | 345/211 |
| 2002/0135552 | A1 * | 9/2002 | Kamiya et al. | 345/89 |
| 2003/0016215 | A1 * | 1/2003 | Slupe | 345/213 |
| 2005/0057552 | A1 * | 3/2005 | Foo et al. | 345/211 |
| 2005/0248697 | A1 | 11/2005 | Ukawa | |
| 2006/0007094 | A1 | 1/2006 | Kang et al. | |
| 2007/0139345 | A1 * | 6/2007 | Shie et al. | 345/98 |
| 2007/0146294 | A1 | 6/2007 | Nurmi et al. | |
| 2007/0195074 | A1 * | 8/2007 | Gelissen | 345/204 |
| 2008/0136765 | A1 | 6/2008 | Neugebauer | |

(Continued)

FOREIGN PATENT DOCUMENTS

| | | |
|---|---|---|
| EP | 1 826 739 | 8/2007 |
| JP | 9 28982 | 2/1997 |
| JP | 2000 162989 | 6/2000 |
| JP | 2001 345928 | 2/2001 |
| JP | 2001 188499 | 7/2001 |
| JP | 2008 139753 | 6/2008 |

(Continued)

*Primary Examiner* — Roy Rabindranath
(74) *Attorney, Agent, or Firm* — Frommer Lawrence & Haug LLP; William S. Frommer; Ellen Marcie Emas

(57) ABSTRACT

A display device includes a display unit, a display control unit, and a control unit. The display unit includes a first and second glass plates, each formed with an electrode connected to a power supply and configured to transmit a light, and a light dispersing element sealed between the first and the second glass plates. The light dispersing element transmits the light when a voltage from the power supply is turned on, and disperses the light when the voltage is turned off. The display control unit controls a timing of turning the voltage on or off, or switching the voltage between positive and negative when the voltage is turned on. The control unit instructs the display control unit to set a display frame rate to a predetermined value during a standby mode, and set it higher than the predetermined value during an information display mode.

8 Claims, 7 Drawing Sheets

(56) References Cited

U.S. PATENT DOCUMENTS

| | | | | |
|---|---|---|---|---|
| 2008/0309652 | A1* | 12/2008 | Ostlund | 345/211 |
| 2009/0015166 | A1* | 1/2009 | Kwon | 315/156 |
| 2010/0085289 | A1* | 4/2010 | Munteanu et al. | 345/88 |

FOREIGN PATENT DOCUMENTS

| | | |
|---|---|---|
| JP | 2010-511900 | 4/2010 |
| WO | WO 03 100759 | 12/2003 |
| WO | WO 2009/040611 | 4/2009 |

* cited by examiner

DISPLAY DEVICE, DISPLAY METHOD, AND PROGRAM FOR SAVING POWER IN A STANDBY MODE

BACKGROUND OF THE INVENTION

1. Field of the Invention

The present invention relates to a display device, a display method, and a program suitable for displaying images, characters, and other information on a display screen while showing a background scene through the display.

2. Description of the Related Art

There have been developed display devices having a transparent display that displays graphics, characters, and other information on a screen, while showing a background scene through the display. Such a transparent display sometimes uses a polymer-dispersed liquid crystal (also referred to as a polymer network liquid crystal, and may be referred to below simply as a liquid crystal). The liquid crystal has a characteristic to disperse an incident light when a voltage is not applied to the liquid crystal and transmits the light as it is when the voltage is applied, which is suitable for transparent displays.

FIG. 8 schematically shows a transparent display 100 in use.

The transparent display 100 is disposed in a display device (not shown) and displays graphics, characters, and other information, as well as the background scene, in rectangular frames in a display area 102. A screen of the transparent display 100 is formed with a plurality of dots, where, when the voltage applied to the liquid crystal corresponding to each dot is turned on and off, a dot applied with the voltage becomes transparent, and a dot not applied with the voltage becomes opaque. When a standby mode for making the screen of the transparent display 100 transparent is set, a background scene 101 is shown on a display area 104 through the transparent display 100. On the other hand, when an information display mode for making the screen of the transparent display 100 opaque is set, graphics, characters, and other information are displayed on an opaque display area 103. Hereinafter, the standby mode or the information display mode may be referred to simply as the mode.

During the standby mode, the screen does not become transparent unless the voltage keeps being applied to the liquid crystal. However, the liquid crystal has a characteristic that molecules are aligned at the moment the voltage is applied but dispersed as the voltage level lowers over time, resulting in an opaque screen. Therefore, by retaining an aligned state of the liquid crystal by switching the voltage applied to the liquid crystal corresponding to each dot between positive and negative at a predetermined display frame rate (for example, 60 frames/second), the transparent state can be retained to transmit the background scene through the screen.

Japanese Unexamined Patent Application Publication No. 2001-188499 discloses a technology of reducing a power consumption by generating a binary display signal with a small power consumption to be output to a display unit in the standby mode.

SUMMARY OF THE INVENTION

When the transparent display 100 is mounted to a mobile phone terminal or the like, it may be desirable to retain the screen in a transparent state even in the standby mode. Therefore, the transparent display 100 may be kept being fed with electric power, which accelerates drain of a battery included in the terminal. Furthermore, if the display frame rate is low when used in a bright environment, the transparent display 100 tends to exhibit a flickering on the screen. A relation between the display frame rate and the flickering on the screen is explained below with reference to FIGS. 9A and 9B.

FIGS. 9A and 9B illustrate examples of the display frame rate of the transparent display 100.

An example in FIG. 9A shows a case in which the display frame rate of the transparent display 100 is 60 Hz.

An example in FIG. 9B shows a case in which the display frame rate of the transparent display 100 is 30 Hz.

In FIGS. 9A and 9B, a solid line indicates voltage values, and a dashed line indicates transmittances of the transparent display 100. The transmittance of the transparent display 100 is higher when the voltage is positive compared to the transmittance when the voltage is negative. Therefore, when the voltage is switched between positive and negative, a difference is generated in the transmittance.

An experiment of measuring a critical fusion frequency (CFF) of human vision reveals that a human can hardly have a temporal resolution of 50 Hz or higher. Accordingly, at a display frame rate of 50 Hz or higher (for example, 60 Hz), the flickering on the screen can hardly be seen. At this time, it is difficult for human eyes to recognize the difference of the transmittance of the transparent display 100 caused by switching the voltage between positive and negative as shown in FIG. 9A and to sense the flickering on the screen.

However, at 50 Hz or lower (for example, 30 Hz), the flickering on the screen is more visible. At this time, it is easier for the human eyes to recognize the difference of the transmittance of the transparent display 100 caused by switching the voltage between positive and negative as shown in FIG. 9B and to sense the flickering on the screen.

For the reasons described above, it is desirable to retain a high display frame rate to make the screen of the transparent display 100 transparent, but it accelerates drain of the battery. Furthermore, even by using the technology disclosed in Japanese Unexamined Patent Application Publication No. 2001-188499, it is difficult to suppress the power consumption, and display colors of the background scene displayed on the screen are limited by performing a binary conversion.

It is desirable to provide a display device that can suppress the power consumption when making the display unit transparent for use.

According to an embodiment of the present invention, with a display unit including a first glass plate formed with a first electrode thereon to be connected to a power supply and configured to transmit a light, a second glass plate formed with a second electrode thereon to be connected to the power supply and configured to transmit the light, and a light dispersing element sealed between the first glass plate and the second glass plate, the light dispersing element being configured to transmit the light when a voltage supplied from the power supply through the first electrode and the second electrode is turned on and disperse the light when the voltage is turned off, a timing of turning the voltage applied to the first electrode and the second electrode on or off is controlled or, when the voltage is turned on, the timing of switching the voltage between positive and negative is controlled based on a predetermined value of a display frame rate.

Instructions are issued to set the display frame rate to the predetermined value during a standby mode for making the display unit transparent, and to set the display frame rate to a value higher than the predetermined value during an information display mode for displaying information on the display unit.

Such a configuration allows for use of the transparent display at the display frame rate suitable for either one of the standby mode and the information display mode.

As described above, according to an embodiment of the present invention, the display frame rate is set to a predetermined value during the standby mode for making the display unit transparent, and set to a value higher than the predetermined value during the information display mode for displaying information on the display unit. Thus, the display frame rate may be increased only when a user displays desired information on the display unit, thereby advantageously suppressing the power consumption in the display unit.

DESCRIPTION OF THE PREFERRED EMBODIMENTS

The best modes (referred to below as an embodiment) of the present invention will be described below in the following order.

1. Embodiment (an example of switching between an information display mode and a standby mode by operating on an operation unit)
2. Another embodiment (an example of changing a display frame rate depending on an environmental illuminance)
3. Variations

1. Embodiment

Example of General Structure of Portable Terminal

Figure 1:
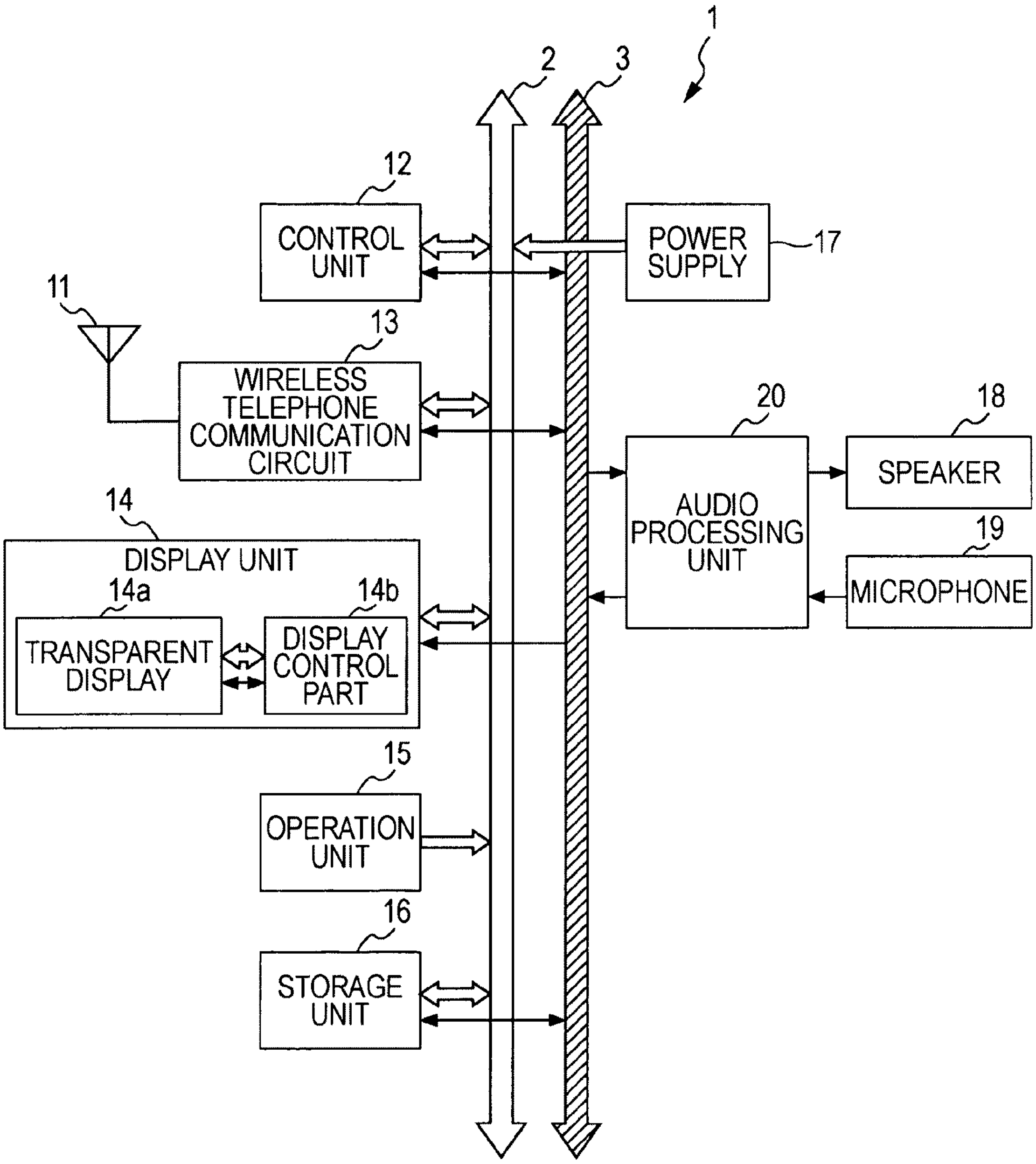
FIG. 1 is a block diagram showing an internal structure of a portable terminal according to an embodiment of the present invention.

FIG. 1 shows an internal structure of a portable terminal 1 according to an embodiment of the present invention.

In the embodiment, a wireless telephone link is established between the portable terminal 1 and a base station to enable wireless communications in various wireless communication schemes such as the CDMA (code division multiple access) scheme. The portable terminal 1 according to the embodiment is capable of switching its screen between a transparent state and an opaque state, and can be used as a display device that transmits a background scene when the screen is transparent and displays graphics, characters, and other information when the screen is opaque.

Although the portable terminal 1 according to the embodiment is supposed to be used as a mobile phone terminal, it may be used for a camera and other mobile terminal devices. The portable terminal 1 is housed in a small housing so that a user can carry it with him/her at all times. The form of the housing is, for example, a bar type or a sliding type. The portable terminal 1 includes a power supply 17 for supplying electric power to various parts in the portable terminal 1. A secondary battery (lithium battery), for example, is employed as the power supply 17.

The portable terminal 1 includes a wireless telephone communication circuit 13 serving as a wireless communication unit for enabling wireless telephone communications with a base station in a predetermined communication scheme. An antenna 11 is connected to the wireless telephone communication circuit 13. Although not shown, another communication circuit may be provided for relatively near-field wireless communications based on Bluetooth® or wireless LAN (local area network), in addition to the communication circuit for the wireless telephone communications.

Wireless telephone communications using the wireless telephone communication circuit 13 is controlled by a control unit 12, which serves as a communication control unit in the portable terminal 1. The control unit 12 also controls processings such as wireless connection to the base station and the like. The control unit 12 further controls various functions in the portable terminal 1 for other than wireless communication by exchanging control data with various parts in the portable terminal 1 via a control line 2.

When audio data is included in a packet received by the wireless telephone communication circuit 13, the audio data is extracted. The audio data extracted from the received packet is supplied to an audio processing unit 20 via a data line 3 to be demodulated into analog audio signals, and the demodulated analog audio signals are supplied to a speaker 18 to be output as a sound.

The portable terminal 1 also includes a microphone 19 through which a sound is input, modulates the sound signal received by the microphone 19 into audio data for transmission using the audio processing unit 20, and supplies the modulated audio data to the wireless telephone communication circuit 13. The wireless telephone communication circuit 13 arranges the supplied audio data in a packet to be transmitted to the base station, and transmits it by wireless communications.

The portable terminal 1 includes a display unit 14 including a liquid crystal display panel and displays various types of information under control of the control unit 12. Information displayed on the display unit 14 includes information about outgoing and incoming telephone calls, registered information such as a telephone directory and an e-mail address list, sent and received e-mails, and images downloaded through the Internet.

The display unit 14 according to the embodiment includes a transparent display 14*a* that turns transparent when a voltage supplied from the power supply 17 is turned on, and turns opaque when the voltage is turned off, and a display control part 14*b* that controls a timing of switching the voltage applied to the transparent display 14*a* between positive and negative based on a display frame rate specified by the control unit 12. The display control part 14*b* further includes a switch 25 that turns on and off the voltage applied to a polymer-dispersed liquid crystal 22 (see FIGS. 2A and 2B).

The control unit 12 transfers image data to the display unit 14. The control unit 12 instructs the display control part 14*b* to set the display frame rate to a predetermined value in a case of a standby mode, and to a value higher than the predetermined value in a case of an information display mode. The transparent display 14*a* functions as a driver integrated circuit that makes a glass panel with electrodes drive the polymer-dispersed liquid crystal 22 (see FIGS. 2A and 2B) injected into it. The display control part 14*b* controls the timing of switching the voltage between positive and negative in the standby mode based on the display frame rate specified by the control unit 12.

The portable terminal 1 includes an operation unit 15, and the control unit 12 performs various processings in response to an operation performed on the operation unit 15. When keys or other elements are operated on the operation unit 15, for example, a telephone call is made through the wireless telephone communication, an e-mail is sent or received, or data communication through the Internet is initiated or terminated. The user can switch the mode using the operation unit 15.

The portable terminal 1 includes a storage unit 16 connected to a control line 2 and a data line 3, and stores, for example, data reconfigured by packets received from an outside in the storage unit 16. The portable terminal 1 also stores a computer program used for a control processing performed by the control unit 12 in the storage unit 16. The storage unit 16 may be, for example, a flash memory or a hard disk drive.

Based on the following mode classification, a mode to change the display frame rate is set in the portable terminal 1. The operation unit 15 is capable of setting any one of the standby mode and the information display mode, and electric power is supplied to the transparent display 14*a* from the power supply 17 in either mode.

Information display mode: A mode in which characters, images and other information are displayed on the screen of the transparent display 14*a* in an opaque state.

Standby mode: A mode in which the user is not using the portable terminal 1 or using the transparent display 14*a* in a transparent state. To display nothing on the screen of the transparent display 14*a*, the power supply to the transparent display 14*a* is generally disabled, but the entire screen of the transparent display 14*a* is preferably kept transparent in the standby mode. For this purpose, the transparent display 14*a* keeps the entire screen transparent while receiving electric power from the power supply 17. At this time, the control unit 12 controls the display frame rate, thereby suppressing a power consumption of the transparent display 14*a*.

The control unit 12 transmits the display frame rate corresponding to the mode selected by the operation unit 15 to the display control part 14*b*. When the standby mode is set, the display control part 14*b* switches the voltage supplied to the transparent display 14*a* between positive and negative at a display frame rate of 20 Hz. This makes the screen of the transparent display 14*a* transparent, through which the background scene of the portable terminal 1 is displayed. On the other hand, when the information display mode is set, the display control part 14*b* switches the voltage supplied to the transparent display 14*a* between positive and negative at a display frame rate of 60 Hz. At this time, an area in which information is displayed is turned opaque to display icons, images, characters, and other information, while remaining area in which the information is not displayed is turned transparent to show the background scene of the portable terminal 1.

Figure 2A:
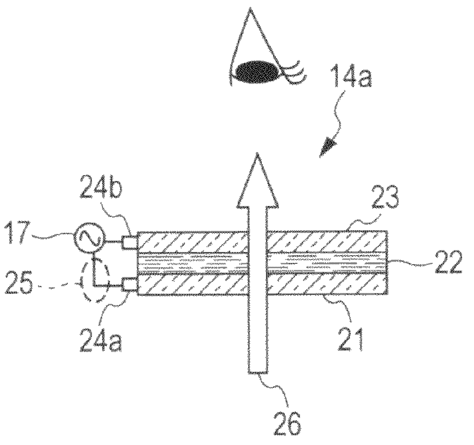
FIGS. 2A and 2B are sectional views illustrating the layer configuration of a transparent display according to the embodiment of the present invention and light beams varying with the voltage on and off.
Figure 2B:
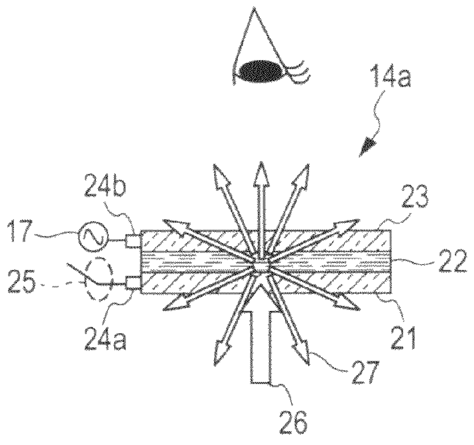

FIGS. 2A and 2B are sectional views illustrating the layer configuration of the transparent display 14*a* and light beams varying with the voltage on and off.

FIG. 2A illustrates an example of the light beam when the voltage is applied.

The transparent display 14*a* is formed by laminating a first glass plate 21, the polymer-dispersed liquid crystal 22, and a second glass plate 23. The first glass plate 21 and the second glass plate 23 have a characteristic to transmit a light therethrough, and are provided with a first electrode 24*a* and a second electrode 24*b*, respectively. The first electrode 24*a* and the second electrode 24*b* are connected to the power supply 17 via conducting wires. The polymer-dispersed liquid crystal 22 is sealed between the first glass plate 21 and the second glass plate 23, and used as a light dispersing element that transmits the light when the voltage supplied from the power supply 17 via the first electrode 24*a* and the second electrode 24*b* is turned on and disperses the light when the voltage is turned off.

The switch 25 for turning on and off a voltage is disposed between the power supply 17 and the first electrode 24*a*. When the switch 25 is turned on, the voltage is applied to the polymer-dispersed liquid crystal 22 to align the liquid crystal molecules. Thus, a light beam 26 entering from the outside transmits through the transparent display 14*a*. At this time, looking at the transparent display 14*a* from the side of the second glass plate 23, the user can see the background scene on the side of the first glass plate 21.

FIG. 2B illustrates an example of the light beam when the voltage is not applied.

When the switch 25 is turned off, the voltage applied to the polymer-dispersed liquid crystal 22 becomes zero, thereby dispersing the liquid crystal molecules. Thus, the light beam 26 entering from the outside is dispersed around as a dispersed light 27 by the polymer-dispersed liquid crystal 22. At this time, looking at the transparent display 14*a* from the side of the second glass plate 23, the user sees the second glass plate 23 turned opaque.

Turning on and off the voltage applied to the first electrode 24*a* and the second electrode 24*b* is performed by the display control part 14*b* upon receipt of an instruction from the control unit 12. The polymer-dispersed liquid crystal 22 has a nature of transmitting an incident light when the voltage is applied to the liquid crystal (FIG. 2A), and dispersing the incident light when the voltage is not applied (FIG. 2B). Accordingly, when the light that entered the polymer-dispersed liquid crystal 22 from the external environment disperses, the screen of the transparent display 14*a* looks whitish.

Figure 3A:
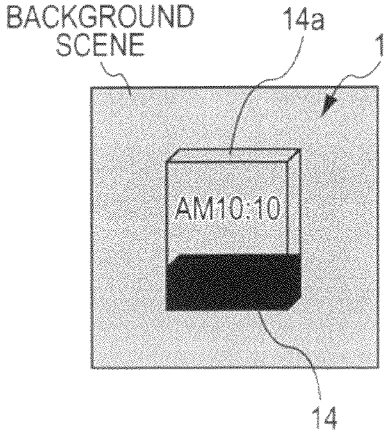
FIGS. 3A, 3B, and 3C illustrate examples of the transparent display according to the embodiment of the present invention in use.
Figure 3B:
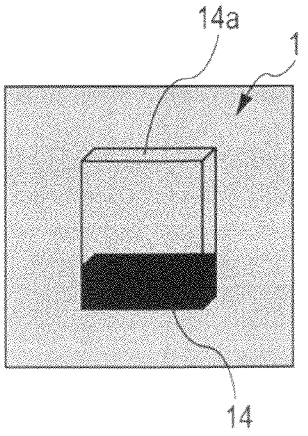
Figure 3C:
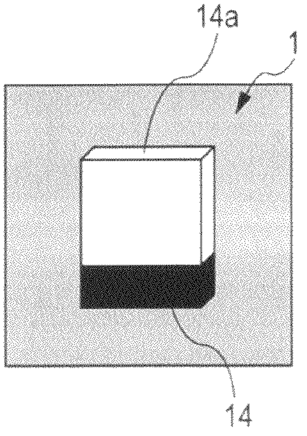

FIGS. 3A, 3B, and 3C illustrate examples of the portable terminal 1 in use.

FIG. 3A illustrates an example of the portable terminal 1 used in the information display mode.

At this time, the transparent display 14*a* becomes partially transparent, where the background scene is displayed therethrough. In an opaque area of the transparent display 14*a*, information such as the present time is displayed.

FIG. 3B illustrates an example of the portable terminal 1 used in the standby mode.

At this time, the entire screen of the transparent display 14*a* becomes transparent, where the background scene is displayed therethrough but information such as graphics and characters is not displayed. In the standby mode, in order to retain this state, it is desirable to suppress the power consumption.

FIG. 3C illustrates an example of the portable terminal 1 used when the voltage applied to the transparent display 14*a* is turned off in the standby mode.

At this time, the entire screen of the transparent display 14*a* becomes opaque, and therefore neither the background scene nor any information is displayed on it.

With such a mobile terminal as a mobile phone terminal, because the terminal is generally in the standby mode for a long time, an amount of consumption current increases as the state of supplying power to the transparent display 14*a* lasts longer, thereby draining the battery more. To cope with this, if the power consumption of the transparent display 14*a* can be suppressed to a lower level in the standby mode, it is more advantageous for the user because, for example, a standby time of the mobile phone terminal can be longer.

Figure 4:
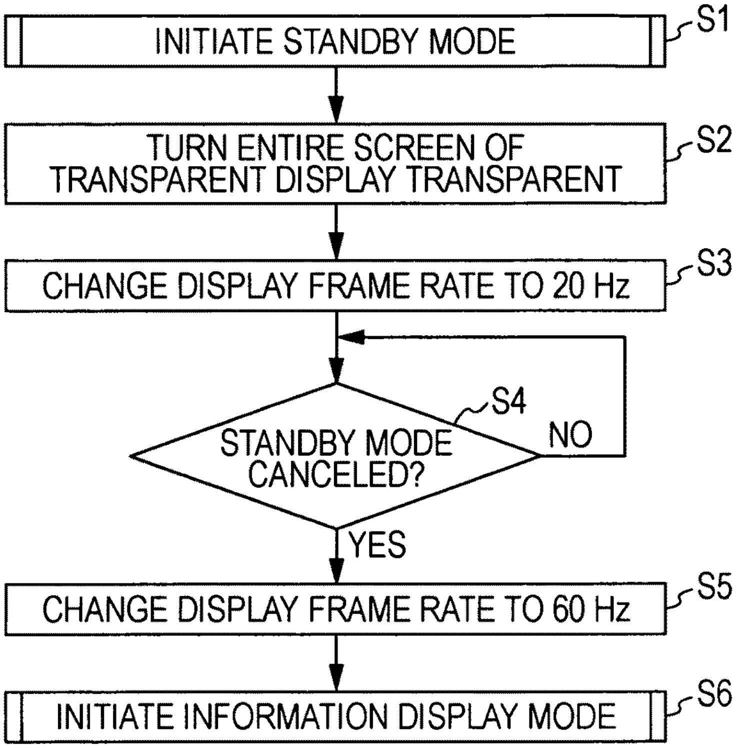
FIG. 4 is a flowchart showing an exemplary processing performed by the portable terminal in a standby mode according to the embodiment of the present invention.

FIG. 4 shows an exemplary processing performed by the control unit 12 for switching the standby mode to the information display mode.

First, the control unit 12 initiates the standby mode (Step S1). The standby mode is initiated in a case where the portable terminal 1 shifts to a power saving state (standby state) when the user does not perform any operation for a certain period of time, or in a case where the user performs a mode switching operation using the operation unit 15. Upon initiation of the standby mode, the display control part 14*b* sets the transparent display 14*a* to make the entire screen transparent (Step S2). The control unit 12 then instructs the display control part 14*b* to change the display frame rate to 20 Hz (Step S3). The display control part 14*b* changes the display frame rate of the transparent display 14*a* to 20 Hz.

Next, the control unit 12 determines whether an instruction to cancel the standby mode (an instruction to switch to the information display mode) was received from the operation unit 15 (Step S4). If the instruction to cancel the standby mode was not received, the control unit 12 keeps the display frame rate of the transparent display 14*a* at 20 Hz to wait for the instruction to cancel the standby mode.

Upon receipt of the instruction to cancel the standby mode from the operation unit 15, the control unit 12 is set to the information display mode. The control unit 12 then instructs the display control part 14*b* to change the display frame rate to 60 Hz (Step S5).

Next, the display control part 14*b* changes the display frame rate of the transparent display 14*a* to 60 Hz. The control unit 12 then initiates the information display mode (Step S6). The change from the information display mode to the standby mode can be instructed by a user performing an operation on the operation unit 15.

According to the embodiment described above, the display frame rate in the information display mode is set higher than the display frame rate in the standby mode. In addition, the display frame rate of the transparent display 14*a* can be arbitrarily changed by the operation by the user to switch the mode. Thus, when the surrounding environment where the portable terminal 1 is used is dark, the power consumption of the power supply 17 can be advantageously suppressed by dropping the display frame rate.

2. Another Embodiment

Next, another embodiment of the present invention will be described below with reference to FIGS. 5 to 7.

In the embodiment, a portable terminal 30 automatically changes the display frame rate of the transparent display 14*a* depending on an environmental illuminance. In the following explanation, the parts explained in the embodiment described earlier are denoted by the same reference characters, and detailed explanations thereof are omitted.

Figure 5:
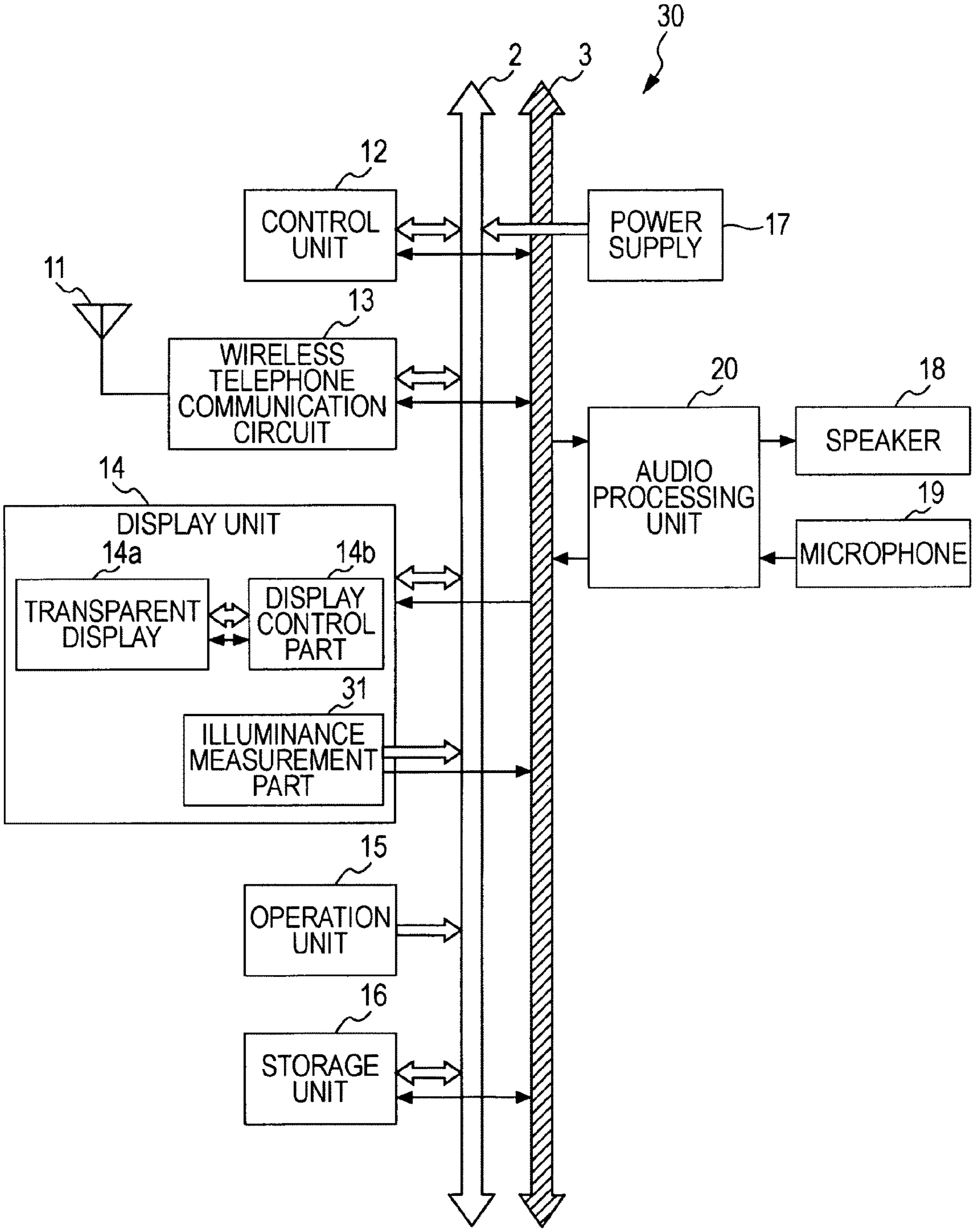
FIG. 5 is a block diagram showing an internal structure of a portable terminal according to another embodiment of the present invention.

FIG. 5 shows an internal structure of a portable terminal 30 according to the other embodiment of the present invention.

In addition to the blocks included in the portable terminal 1 according to the embodiment described earlier, the portable terminal 30 includes an illuminance measurement part 31 for measuring the environmental illuminance. The illuminance measurement part 31 according to the other embodiment is included in the display unit 14.

The illuminance measurement part 31 outputs an analog voltage based on an illuminance value (referred to below as an environmental illuminance) obtained by measuring an illuminance of the surrounding environment of the portable terminal 30. The control unit 12 according to the embodiment controls an operation of the polymer-dispersed liquid crystal 22, includes an analog voltage input port, and performs a predetermined arithmetic processing by converting an input signal of the analog voltage based on the environmental illuminance into digital data. The control unit 12 then notifies the display control part 14*b* of the display frame rate corresponding to the standby mode or the information display mode set based on the environmental illuminance obtained from the illuminance measurement part 31.

The transparent display 14*a* according to the embodiment has the following natures.

(1) The power consumption can be suppressed by reducing the display frame rate of the transparent display 14*a*.

(2) According to a subjective evaluation, it has become obvious that, compared to a typical liquid crystal display device, the user of the transparent display 14*a* hardly recognizes a flickering on the screen with a reduced display frame rate when the environmental illuminance is low. For example, when the environmental illuminance is 10,000 lx, the display frame rate should be set to about 60 Hz, while the display frame rate can be reduced to about 20 Hz when the environmental illuminance is 500 lx.

(3) The polymer-dispersed liquid crystal 22 has a characteristic to show a white color more clearly with a stronger incident light. From the characteristic, it has become obvious that a display on the transparent display 14*a* becomes less visible in a dark environment.

Therefore, in consideration of the following points, the control unit 12 suppresses the power consumption of the power supply 17 in the standby mode by controlling the transparent display 14*a* via the display control part 14*b*.

(1) The control unit 12 changes the display frame rate of the transparent display 14*a* depending on the environmental illuminance. The control unit 12 sets the display frame rate to a higher value when the illuminance is high, and it sets the display frame rate to a lower value when the illuminance is low.

(2) If the environmental illuminance is no higher than one lx, the control unit 12 stops supplying power from the power supply 17 to the transparent display 14*a* to turn the entire screen of the transparent display 14*a* white. However, though the criterion is one lx in the embodiment, it can be any illuminance value that makes a user feel dark.

Figure 6:
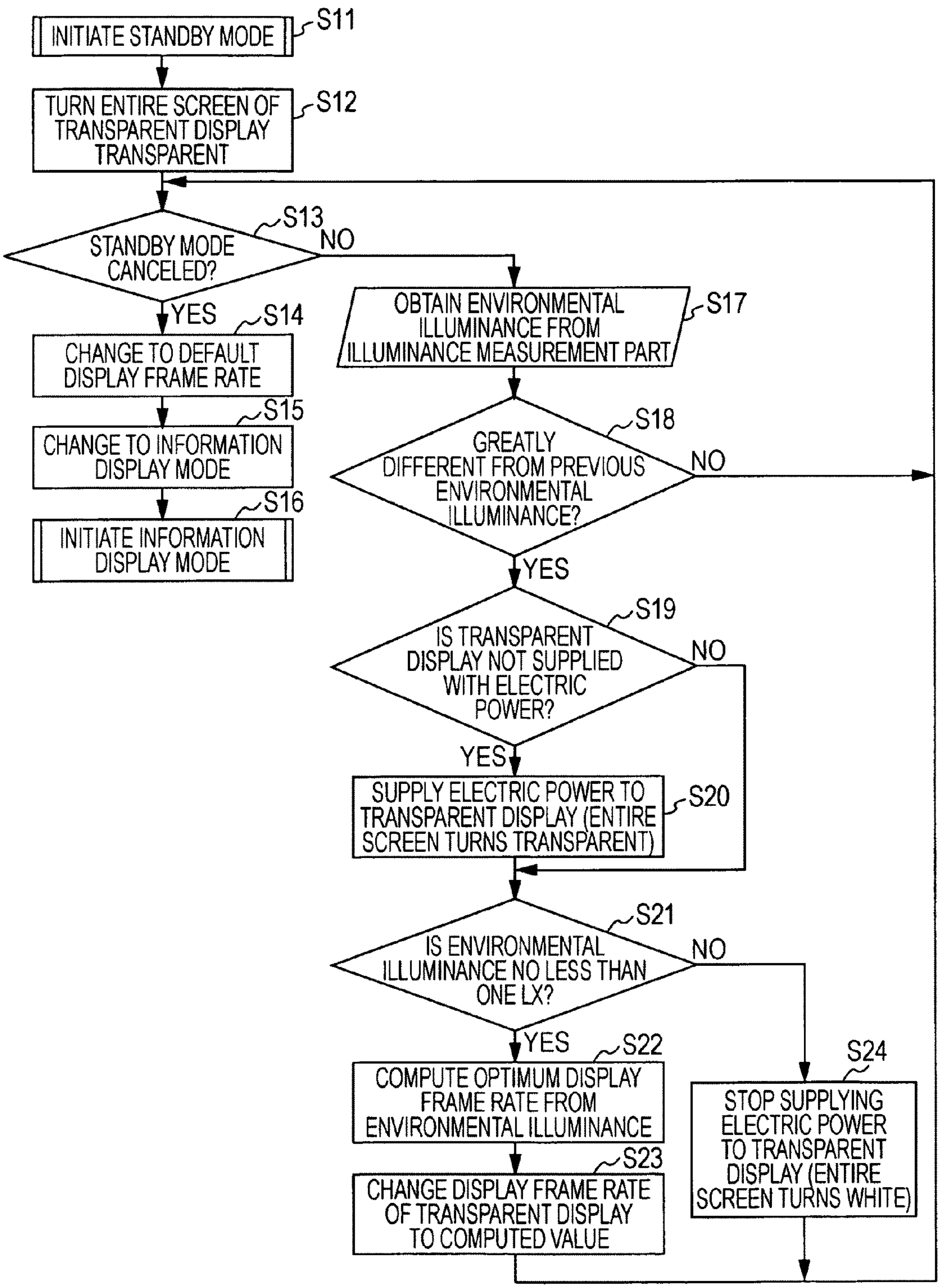
FIG. 6 is a flowchart showing an exemplary processing performed by the portable terminal in the standby mode according to the other embodiment of the present invention.

FIG. 6 shows an exemplary processing for initiating the information display mode from the standby mode.

First, the control unit 12 initiates the standby mode (Step S11). Conditions to initiate the standby mode are same as those in the case of Step S1 in FIG. 4 described above. Next, the display control part 14*b* turns the entire screen of the transparent display 14*a* transparent (Step S12). At this time, the display frame rate is set to, for example, 20 Hz.

The display control part 14*b* determines whether the standby mode was cancelled (Step S13). In the embodiment, the control unit 12 determines whether the standby mode was cancelled based on the environmental illuminance. The determination at Step S13 is made, for example, on a minute-by-minute basis, and, when a switching operation to the information display mode is performed through the operation unit 15, an interruption processing is preferentially performed.

If the standby mode is cancelled, the control unit 12 transmits the default display frame rate (for example, 60 Hz) to the display control part 14*b* to shift to the information display mode. The display control part 14*b* changes the display frame rate of the transparent display 14*a* to the default display frame rate (Step S14). The control unit 12 then changes the setting to the information display mode (Step S15), and initiates the information display mode (Step S16).

On the other hand, when it is determined that the standby mode was not cancelled at Step S13, the control unit 12 obtains the environmental illuminance from the illuminance measurement part 31 (Step S17). The obtained environmental illuminance is temporarily stored in the storage unit 16.

Next, the control unit 12 determines whether the previous environmental illuminance read from the storage unit 16 is greatly different from the current environmental illuminance (Step S18). If the current environmental illuminance is substantially equal to the previous environmental illuminance, the process returns to Step S13.

On the other hand, if the current environmental illuminance is greatly different from the previous environmental illuminance, the control unit 12 determines whether electric power is not supplied to the transparent display 14*a* (Step S19). When the control unit 12 determines that the electric power is supplied to the transparent display 14*a*, the process moves to Step S21.

When the control unit 12 determines that the electric power is not supplied to the transparent display 14*a*, the control unit 12 instructs the display control part 14*b* to start supplying the electric power to the transparent display 14*a* (Step S20). When the electric power is supplied from the power supply 17 to the transparent display 14*a* and the display control part 14*b* drives the transparent display 14*a* at the predetermined display frame rate, the entire screen of the transparent display 14*a* is turned transparent.

Next, the control unit 12 determines whether the environmental illuminance obtained at Step S17 is no less than a predetermined value (Step S21). In the embodiment, the predetermined value is one lx. When the control unit 12 determines that the environmental illuminance is no less than one lx, the control unit 12 computes an optimum display frame rate from the environmental illuminance (Step S22).

Next, the control unit 12 notifies the display control part 14*b* of the computed display frame rate, and the display control part 14*b* changes the display frame rate to the computed display frame rate (Step S23). At Step S22 and Step S23, the control unit 12 sends an instruction to the display control part 14*b* to set the display frame rate between 20 Hz and 60 Hz depending on the environmental illuminance. For example, when it is determined that the environment is bright, the control unit 12 sends an instruction to the display control part 14*b* to change the display frame rate to 60 Hz.

After that, the control unit 12 returns the process to Step S13.

On the other hand, when the control unit 12 determines that the environmental illuminance is less than one lx at Step S21, the control unit makes the display control part 14*b* stop supplying electric power to the transparent display 14*a*, and turns the voltage applied to the transparent display 14*a* off (Step S24). As a result of this, the entire screen of the transparent display 14*a* turns white. The control unit 12 then returns the process to Step S13. The instruction to shift from the information display mode to the standby mode may be issued by the user operation through the operation unit 15.

Figure 7:
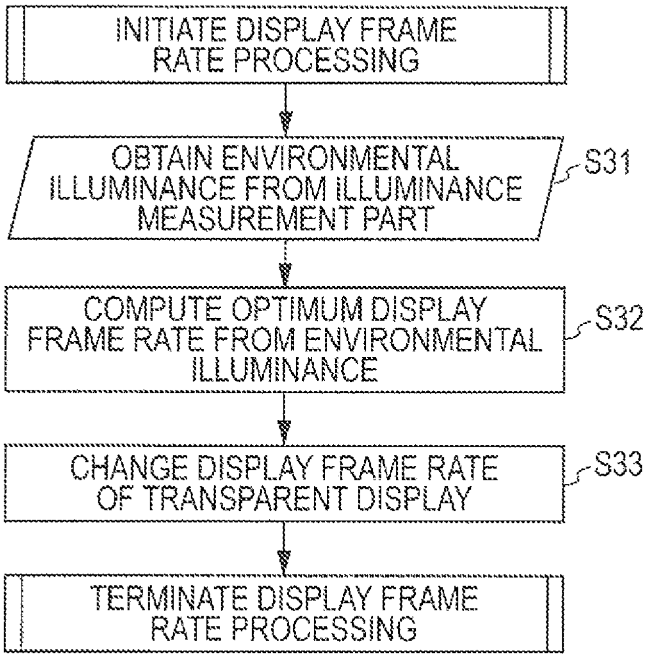
FIG. 7 is a flowchart showing an exemplary processing performed to display information by the portable terminal according to the other embodiment of the present invention.
Figure 8:
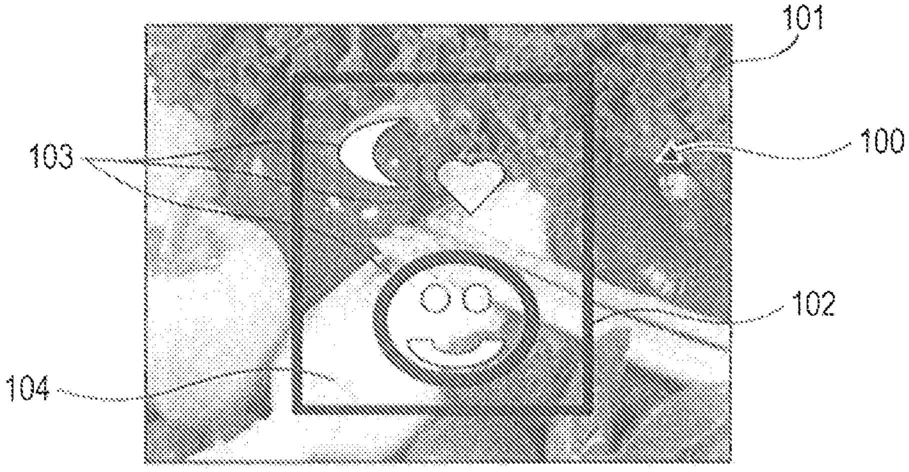
FIG. 8 PRIOR ART
FIG. 8 illustrates an example of a transparent display in the past in use.
Figure 9A:
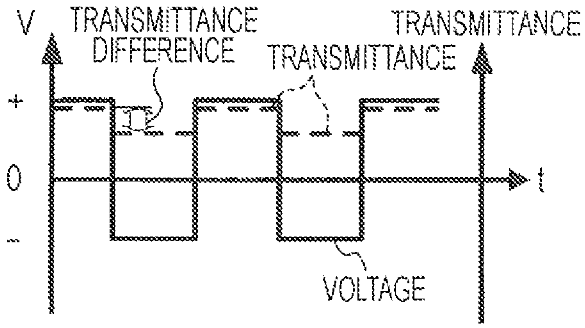
FIG. 9A PRIOR ART
FIGS. 9A and 9B illustrate examples, of the display frame rate of the transparent display in the past.
Figure 9B:
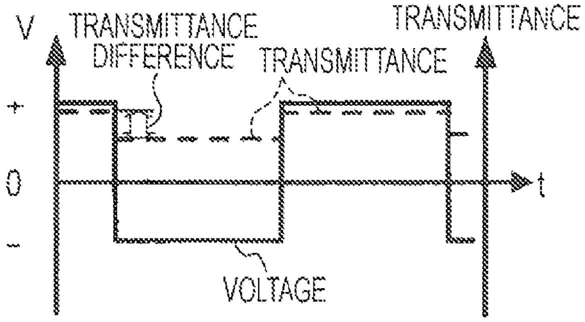
FIG. 9B PRIOR ART

FIG. 7 shows an exemplary processing performed by the control unit 12 to change the display frame rate.

If the standby mode is set at the beginning, the control unit 12 obtains the environmental illuminance from the illuminance measurement part 31 (Step S31). Next, the control unit 12 computes the optimum display frame rate based on the environmental illuminance (Step S32).

The control unit 12 notifies the display control part 14*b* of the computed display frame rate. As a result of this, the display control part 14*b* changes the display frame rate of the transparent display 14*a* to the display frame rate computed by the control unit 12 (Step S33).

With the portable terminal 30 according to the embodiment described above, the control unit 12 can change the display frame rate of the transparent display 14*a* by instructing the display control part 14*b* to change to the optimum display frame rate based on the environmental illuminance measured by the illuminance measurement part 31 during the standby mode. Accordingly, the display frame rate suitable for the environment in which the portable terminal 30 is used can be set without a clear instruction by the user, whereby the user-friendliness is advantageously improved.

There is also assumed a state in which the portable terminal 30 is not used at all because the user puts the portable terminal 30 in a bag or the like during the standby mode. However, because the control unit 12 measures the environmental illuminance at a predetermined cycle, when it is determined that the environmental illuminance is less than one lx, the control unit 12 stops supplying electric power to the transparent display 14*a*. Accordingly, the power consumption of the power supply 17 can be advantageously suppressed.

The switching process of the display frame rate described above with reference to FIG. 6 may be applied during the information display mode. However, during the information display mode in a place where the environmental illuminance is low (darkness or the like), another light source is used to illuminate the screen of the transparent display 14*a*, the power supply 17 keeps supplying electric power to the light, and the processing at Step S24 shown in FIG. 6 is not performed anymore. Accordingly, the processing performed during the information display mode includes only changing the display frame rate depending on the environmental illuminance.

The switching process of the display frame rate is also applicable to a case in which the display frame rate is reduced when the standby mode is set independent of the environmental illuminance. In this case, when the standby mode is set, the entire screen of the transparent display 14*a* is turned transparent first. The display frame rate is then reduced from 60 Hz to 20 Hz, thereby easily suppressing the electric power consumed by the transparent display 14*a*.

The control unit 12 determines the switching of the mode at every predetermined time period (for example, one minute). Accordingly, the consumption of the electric power charged in the power supply 17 can be advantageously suppressed compared to the case of determining the switching of the mode all the time.

Although the portable terminals according to the embodiments described above were applied to mobile phone terminals, they may be applied to other electronic devices. They may also be applied to a display device or the like equipped with a super twisted nematic (STN) liquid crystal, which is often used in a digital watch and the like. The illuminance measurement part 31 can be disposed in the transparent display 14*a*.

A recording medium recorded with software program codes realizing the functions described in the embodiments can be provided to the portable terminal. It should be appreciated that the functions can be realized by a computer (or a control device such as a central processing unit) in the system or the device reading out and executing the program codes recorded in the recording medium.

The recording medium used for providing the program codes can be, for example, a floppy disk, a hard disk, an optical disk, a magneto optical disk, a compact disc-read only memory (CD-ROM), a compact disc-recordable (CD-R), a magnetic tape, a non-volatile memory card, or a read only memory (ROM).

By executing the program codes read out by the computer, the functions described in the embodiments are realized. In addition, based on an instruction by the program codes, an operating system or the like operating on the computer performs a part or all of the actual processing. A case is also included in which the functions described in the embodiments are realized by the processing.

The present application contains subject matter related to that disclosed in Japanese Priority Patent Application JP 2009-106854 filed in the Japan Patent Office on Apr. 24, 2009, the entire content of which is hereby incorporated by reference.

It should be appreciated that the present invention is not limited to the embodiments described above but can be realized in other configurations within the scope of the present invention.

What is claimed is:

1. A display device comprising:

a display unit including a first glass plate formed with a first electrode thereon to be connected to a power supply and configured to transmit a light, a second glass plate formed with a second electrode thereon to be connected to the power supply and configured to transmit the light, and a light dispersing element sealed between the first glass plate and the second glass plate, the light dispersing element being configured to (a) transmit the light when a voltage, supplied from the power supply through the first electrode and the second electrode, is turned on and (b) disperse the light when the voltage is turned off;

a display control unit configured to (a) in a standby mode, turn the voltage applied to the first electrode and the second electrode off when environmental illumination is below a predetermined illumination value wherein the display unit is turned white and, (b) when the voltage is turned on in the standby mode, control the timing of switching the voltage between positive and negative based on a display frame rate received from a control unit; and the control unit configured to instruct the display control unit (a) to set the display frame rate to one of several predetermined values based on an amount of the environmental illumination being equal to or greater than the predetermined illumination value during the standby mode for making the display unit transparent, and (b) set the display frame rate to a value higher than the predetermined value during an information display mode for displaying information on the display unit.

2. The display device according to claim 1, wherein the control unit instructs the display control unit to set the display frame rate to 20 Hz during the standby mode and set the display frame rate to 60 Hz during the information display mode.

3. The display device according to claim 2, further comprising an operation unit configured to set one of the standby mode and the information display mode.

4. The display device according to claim 1, further comprising an illuminance measurement unit configured to measure the environmental illuminance of a surrounding environment, wherein the control unit instructs the display control unit to set the display frame rate corresponding to the standby mode or the information display mode based on the environmental illuminance obtained from the illuminance measurement unit.

5. The display device according to claim 4, wherein the control unit instructs the display control unit to turn the voltage off when the environmental illuminance is less than the predetermined illumination value during the standby mode, and set the display frame rate between 20 Hz and 60 Hz depending on the environmental illuminance when the environmental illuminance is no less than the predetermined illumination value during the standby mode.

6. The display device according to claim 5, further comprising an operation unit configured to set one of the standby mode and the information display mode.

7. A display method comprising the steps of:

with a display unit including a first glass plate formed with a first electrode thereon to be connected to a power supply and configured to transmit a light, a second glass plate formed with a second electrode thereon to be connected to the power supply and configured to transmit the light, and a light dispersing element sealed between the first glass plate and the second glass plate, the light dispersing element being configured to (a) transmit the light when a voltage, supplied from the power supply through the first electrode and the second electrode, is turned on and (b) disperse the light when the voltage is turned off, turning the voltage applied to the first electrode and the second electrode off in a standby mode when environmental illumination is below a predetermined illumination value wherein the display unit is turned white and, when the voltage is turned on in the standby mode, controlling the timing of switching the voltage between positive and negative based on a display frame rate which is input thereto; and issuing an instruction to set the display frame rate to one of several predetermined values based on an amount of the environmental illumination being equal to or greater than the predetermined illumination value during the standby mode for making the display unit transparent, and to set the display frame rate to a value higher than the predetermined value during an information display mode for displaying information on the display unit.

8. A computer program embodied on a non-transitory computer readable medium to cause a computer to execute the steps of:

with a display unit including a first glass plate formed with a first electrode thereon to be connected to a power supply and configured to transmit a light, a second glass plate formed with a second electrode thereon to be connected to the power supply and configured to transmit the light, and a light dispersing element sealed between the first glass plate and the second glass plate, the light dispersing element being configured to (a) transmit the light when a voltage, supplied from the power supply through the first electrode and the second electrode is turned on and (b) disperse the light when the voltage is turned off, turning the voltage applied to the first electrode and the second electrode off in a standby mode when environmental illumination is below a predetermined illumination value wherein the display unit is turned white and, when the voltage is turned on in the standby mode, controlling the timing of switching the voltage between positive and negative based on a display frame rate which is input thereto; and issuing an instruction to set the display frame rate to one of several predetermined values based on an amount of the environmental illumination being equal to or greater than the predetermined illumination value during the standby mode for making the display unit transparent, and to set the display frame rate to a value higher than the predetermined value during an information display mode for displaying information on the display unit.

* * * * *